G. A. GLASS.
BROILER SUPPORT.
APPLICATION FILED JUNE 21, 1911.
1,006,746.
Patented Oct. 24, 1911.
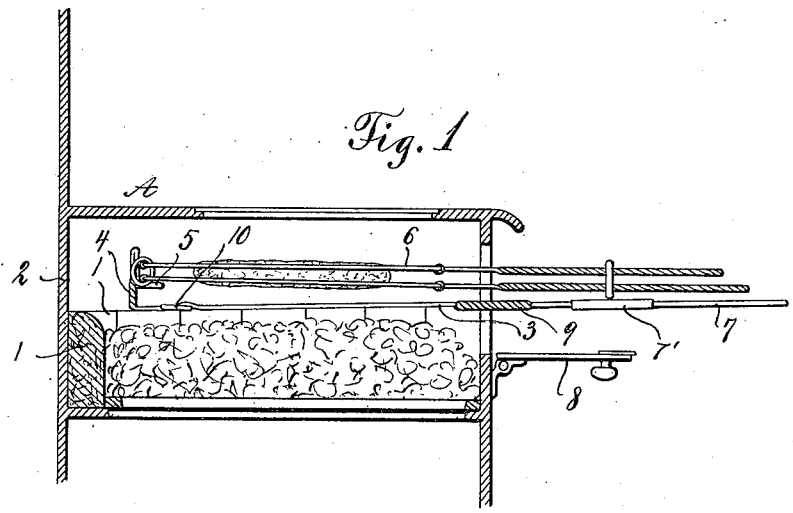
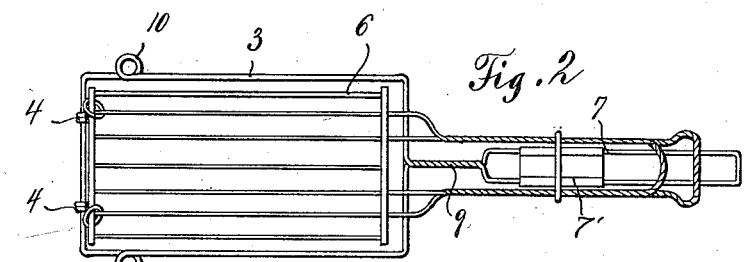
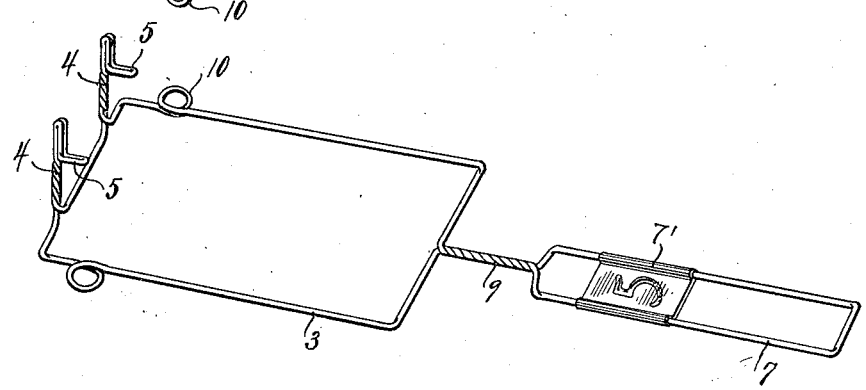
WITNESSES:
ELarson
G. D. Rose.
INVENTOR
George A. Glass
BY Richard Cobb
Attorneys

UNITED STATES PATENT OFFICE.

GEORGE A. GLASS, OF NEWARK, NEW JERSEY.

BROILER-SUPPORT.

1,006,746.  Specification of Letters Patent.  Patented Oct. 24, 1911.

Application filed June 21, 1911. Serial No. 634,615.

*To all whom it may concern:*

Be it known that I, GEORGE A. GLASS, a citizen of the United States, residing at Newark, in the county of Essex and State of New Jersey, have invented certain new and useful Improvements in Broiler-Supports, of which the following is a specification.

In the use of the ordinary broiler employed in cooking meat, such as steak or the like, the broiler is customarily held in the hand over the fire or hot coals during the cooking operation. In using broilers in the above manner, the meat supported by the device is frequently burned or singed and its flavor spoiled partly, if not wholly, because it is impracticable to hold the broiler steadily over the fire. Furthermore, it is customary in broiling meat over fires of coal stoves to remove the lids of the stove in order to facilitate the arrangement of the broiler in proper position over the burning coals and the fumes and odors incidental to the cooking of the meat are thus allowed to escape into the room and throughout apartments, which is very undesirable for obvious reasons.

It is the primary object of the present invention to provide an advantageous form of support or rest adapted to be placed in the fire-box of ordinary coal stoves to assume a position just above the seat of combustion, said support being designed especially to coöperate with a broiler of ordinary type to hold the latter during the broiling of a piece of meat. Since the invention is adapted to be inserted into the combustion chamber of the stove through a front door of the latter, it is rendered unnecessary to remove the lids of the stove, and while the meat is broiling, odors passing off therefrom are not permitted to escape from the stove.

Aside from the foregoing, various advantages are obtained in the practical use of the broiler supporting device, as will be appreciated more fully by reference to the following detail description and the accompanying drawings, in which—

Figure 1 is a sectional view of a portion of a stove showing the invention arranged operatively therein, as when in use supporting a broiler; Fig. 2 is a top plan view of the device having the broiler arranged thereon; Fig. 3 is a perspective view of the supporting device alone.

Throughout the following description and on the several figures of the drawings, similar parts are referred to by like reference characters.

In the drawings, the stove is indicated at A and is of any conventional type at present in use, having the usual lining 1 and fire back 2. The support comprising the invention is designated 3 and consists of a frame which is preferably of rectangular form, said frame carrying certain parts adapted to hold the broiler in proper position over the hot coals in the fire box of the stove. The frame of the support 3 is provided at its inner end with short vertical standards 4 having the outwardly extending arms 5 intermediate the upper and lower extremities of said standards. The arms 5 constitute rests adapted to support the inner end of the broiler 6, as shown most clearly in Figs. 1 and 2 of the drawings. It is contemplated that the broiler supports of this invention shall be made in different sizes to fit into the fire boxes of stoves of different sizes and the frame of the support is adapted to rest upon the fire brick lining and water back which form the walls of the fire box of the stove. At its outer end the frame of the support 3 is formed with a handle 7 which constitutes practically a horizontal arm projecting from the support a sufficient distance to permit the handle of the broiler 6 to rest thereon. When in operative position therefore, the broiler 6 will be supported at its innermost end in the fire box of the stove A by the arms or rests, the broiler inclining downwardly from the parts 5 to the point where its handle rests upon the handle 7 of the support 3. Of course, the handles of both the support 3 and broiler 6 project through the door opening of the stove when the parts are being used in the broiling of a piece of meat. The door of the stove is indicated at 8.

In its commercial form, it is preferred to make the invention from a single length of wire of suitable gage, said wire being bent to provide the frame 3 and the wire at the inner end of said frame being bent upwardly and twisted to provide the integral parts 4 and 5 just described. The wire at the outer end of the frame 3 is twisted to form the shank 9 and then separated to form the spaced parts of the handle 7. A plate 7' of sheet metal may be attached to the handle and stamped with a number indicating the size of the device and such other indicia as might be desirable thereon. The opposite sides of the frame 3 may be formed with a plurality of loops 10 located in the same plane as the body of the frame 3, said loops forming small rests to assist in supporting the device in the fire box. Any number of the loops 10 may be used, as found most convenient.

It will be apparent that a device embodying the invention may be very cheaply constructed in accordance herewith and when in actual use, said device will advantageously support the broiler carrying the meat so that there is no likelihood of burning or scorching the latter to render the same distasteful, nor is there any likelihood that dirt or foreign matter will lodge on the meat by the same being accidentally brought into contact with the hot coals of the fire, a frequent occurrence when the broiler is held in the hand. The broiler when supported on the device 3 will furthermore be so spaced from the hot coals that smoke, caused by burning of grease dropping from the meat, can freely pass off with the draft from the fire box, not affecting the flavor of the meat in any way. Since the lids of the stove may remain thereon while the invention is being used, articles of food may be readily cooked on the stove during the broiling operation.

The construction of the invention is such that the same may be readily inverted in placing it in the stove, whereby the members 4 depend from the support 3, under which conditions the broiler will be lowered a short distance in the fire box when operatively arranged upon the device. When the coals in the fire box are low, it will be apparent that the inverted arrangement of the supporting device will be especially advantageous in order to bring the meat closer to the fire to facilitate the broiling operation.

Having thus described the invention, what is claimed as new is:

1. In combination with a broiler, a support therefor consisting of an open frame provided at one end with upwardly extending standards, short arms projecting outwardly from said standards intermediate of their ends, the opposite end of the frame having an arm projecting centrally therefrom and provided with a handle, said handle forming a rest for the broiler.

2. As a new article of manufacture, a broiler supporting device consisting of a length of wire bent to provide an approximately rectangular frame adapted to be inserted into the fire box of a stove, the wire at one end of the frame being bent upwardly and downwardly to form vertical standards, and horizontal arms projecting from said standards intermediate of their ends, the wire at the other end portion of the frame being twisted to form a shank and then bent to provide a handle, said handle forming a rest for the broiler.

In testimony whereof I affix my signature in presence of two witnesses.

GEORGE A. GLASS.

Witnesses:
 FRANCIS S. MAGUIRE,
 JOHN F. ROBB.

---

Copies of this patent may be obtained for five cents each, by addressing the "Commissioner of Patents, Washington, D. C."